United States Patent
Herbst

[15] 3,704,414
[45] Nov. 28, 1972

[54] FREQUENCY METER
[72] Inventor: John A. Herbst, Morristown, N.J.
[73] Assignee: Bogue Electric Manufacturing Company, Paterson, N.J.
[22] Filed: Jan. 18, 1971
[21] Appl. No.: 107,010

[52] U.S. Cl. .............................324/79 D, 324/78 J
[51] Int. Cl. .........................G01r 23/14, G01r 23/02
[58] Field of Search........324/78 R, 78 D, 79 D, 79 R, 324/186; 235/92 T, 92 F

[56] References Cited

UNITED STATES PATENTS 2,844,790  7/1958  Thompson et al........235/92 T
3,509,484  4/1970  Basse......................324/78 D
3,227,952  1/1966  Proebster et al.........324/79 D Primary Examiner—Alfred E. Smith
Attorney—Philip G. Hilbert

[57] ABSTRACT

A frequency monitor for giving a meter indication of the frequency of a signal utilizes a zero-crossing detector to control the counting of clock pulses to a pair of cascaded binary counters. The first counter covers the bulk of the period between zero crossings and the second counter covers the remainder thereof. The count in the second counter is periodically stored and fed to a digital-to-analog converter which includes means for performing an analog linearization of currents which energize a meter; such meter being calibrated in Hertz per unit current.

10 Claims, 2 Drawing Figures

FREQUENCY METER

BACKGROUND OF THE INVENTION

This invention pertains to apparatus for measuring and monitoring the frequency of periodic waveforms, commonly known as frequency meters.

Devices of this type in common usage fall into two classes; one of which uses some type of resonant device, such as a tuned inductor-capacitor network, or a mechanically tuned reed. The other class of devices count the number of cycles occurring within a carefully measured time interval. Devices in both classes have certain deficiencies.

Thus, resonant devices using tuned networks are slow in response and a sensitivity to both voltage and harmonic distortion of the waveform being measured. Additionally, for precision accuracy, care must be given to the temperature-reactance effects of both the inductor and the capacitor. With the tuned reed devices, the resolution is limited, and again, temperature effects will be noted due to expansion coefficients and temperature induced variations in mechanical stiffness.

With the counter type devices, the deficiency lies in respect to speed of response when accuracy is desired. Thus, if it is desired to measure a 400 Hertz alternating waveform to a 0.1 Hertz resolution, a count base of at least 10 seconds is required. If the frequency is changing, the accuracy disappears, since the device only indicates that a certain number of cycles have occurred in the past, which may or may not be the current rate. In addition, if the device is used as a monitor for manually making changes in frequency, the slowness of response is objectionable.

It is therefore, a general object of the invention to provide an improved frequency meter for displaying, in analog form, the frequency of a periodic waveform.

Another object of this invention is to provide a frequency meter which is unaffected by the wave shape or harmonic content of the periodic waveform.

A further object of the invention is to provide a frequency meter which is relatively unaffected by the amplitude of the periodic waveform.

Still a further object of this invention is to provide a meter of the character described, whose response to changes in rate of the periodic waveform is detected within one cycle and displayed immediately.

Yet another object of this invention is to provide a meter of the character described having means which effectively expands the trailing portion of the periodic waveform to give high precision measurement with minimum complexity.

Yet a further object of this invention is to provide a highly linear frequency meter which measures the period of the input signal and converts the period to a frequency indication.

Other objects of this invention will in part be obvious and in part hereinafter pointed out.

Briefly, the invention contemplates apparatus for measuring the frequency of a periodically recurring signal by measuring the time for one period of the signal. The apparatus includes means for indicating the start of each cycle of the signal, a source of pulses having a frequency very much higher than the frequency of the signal, and first and second pulse counters.

Switching means which includes first means responsive to the start of cycle indicating means, control the switching means to connect the pulse source to the input of the first counter at the start of each cycle and second means connect the pulse source to the input of the second counter whenever the first counter accumulates a predetermined count.

A count memory means is controlled to store the count in the second counter at the start of each cycle of the periodically recurring signal. Means connected to the memory means convert the stored pulse count to an analog representation of the frequency of the periodically recurring signal.

DESCRIPTION OF THE PREFERRED EMBODIMENTS

Figure 1:
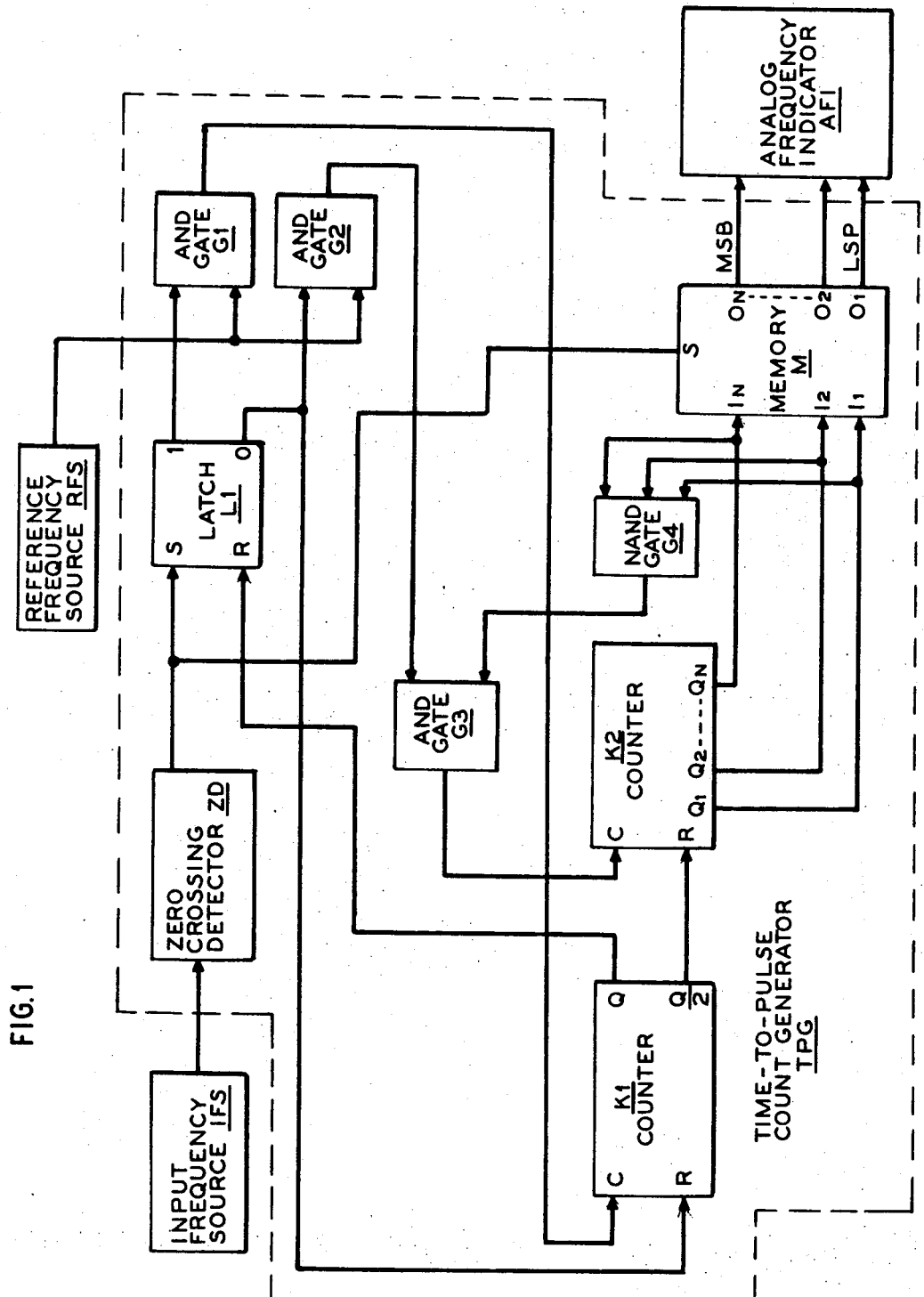
FIG. 1 is a block diagram of the frequency meter embodying the invention.

In FIG. 1 there is shown a frequency monitoring system wherein the period of each cycle of a periodic waveform from input frequency source IFS is measured by counting in time-to-pulse count generator TPG, the number of clock pulses from reference source RFS that occur in each cycle of the periodic waveform. This pulse count is stored in a memory and updated at the termination of each cycle.

Thus, the output of the memory always shows the clock pulse count of the immediately preceeding cycle. This digital count is fed to an analog frequency indicator AFI.

Although the system can monitor many kinds of periodically recurring waveforms, the following specific example will be illustrative thereof. To aid in understanding the operating principals, it will be assumed that it is desired to display the actual frequency of a nominal 400 Hertz generating system, with a frequency range of 390 to 410 Hertz, and a resolution of 0.1 Hertz.

It has been found that the design should be based on a somewhat larger span than the actual meter range, so that the "out-of-range" conditions can easily be detected. The calculations will therefore be on the basis of 389 to 411 Hertz. The actual time for 389 Hertz is 2,570.7 microseconds per cycle, and for 411 Hertz is 2,433.1 microseconds per cycle. The actual time span of interest is 2,570.7–2,433.1, or 137.6 microseconds.

The first problem is to select a clock frequency for the reference frequency source RFI. Since the desired resolution is 0.1 in 20 Hertz, or one part in 200, the clock frequency should give at least 200 counts in 137.6 microseconds. Also, since the stable reference is asynchronous with regard to the 400 Hertz input, an ambiguity of one count exists. It is therefore desirable to double the number of counts to 400.

According to the invention, two counters should be used. Since it is desirable to have the first counter a simple binary device, using if possible, a power of 2 for its count, the first counter should count to $2^{13}$ or 8,192 in 2,433.1 microseconds. Therefore, the required frequency is 8,192 divided by 2433.1 x $10^{-6}$ which equals 3.36700 megahertz.

The total count for 389 Hertz is therefore 3,36700 times 2,570.7 or 8,656 counts. Since the first counter counts 8,192, the second counter will receive 8,656 minus 8,192 or 464 counts, which satisfies the 400 count criterion. This counter must therefor be designed for $2^9$ or 512 counts.

With this set of parameters, the operation of the apparatus shown in FIG. 1, will be described. The input frequency source IFS is connected to a zero crossing detector ZD. Such detector can comprise a high gain amplifier, whose output is differentiated by a resistor-capacitor network to give a narrow, sharp pulse at the beginning of each cycle.

The output of detector ZD is connected to set input S of latch L 1 whose set or "1" output is connected to one input of two-input AND-gate G 1 and whose reset or "0" output is connected to one input of two-input AND-gate G 2. The output of AND-gate G 1 is connected to the input of counter K 1. The other input of each of the AND gates is connected to reference frequency source RFS.

The reference frequency source RFS can be a stable frequency generator giving suitably narrow pulses at a rate of 3,367,000 per second as selected above. A quartz crystal osscillator of the type used in many digital systems is suitable for this purpose. The accuracy of the frequency measurement is dependent on the stability of the source RFS. Stability of sufficiently high degree is readily attained with this type of oscillator.

Thus, when latch L 1 is set, AND-gate G 1 is open and AND-gate G 2 is blocked. Accordingly, the pulses from source RFS are fed to counter K 1. Counter K 1 is provided with an output Q which emits a pulse when 8,192 pulses have been accumulated and with an output Q/2 which emits a pulse when 4,096 pulses have been accumulated. The output Q is connected to the reset input R of latch L 1 and the output Q/2 is connected to reset input R of counter K 2. Thus, when 4,096 pulses have been accumulated, counter K 2 is set to zero and all of its inputs Q 1 to Q N go to zero. Each of the outputs of counter K 2 is connected to a different input of NAND-gate G 4.

The output of NAND-gate G 4 is connected to one input of two-input AND-gate G 3 whose other input is connected to the output of AND-gate G 2. The output of AND-gate G 3 is connect ed to the input of counter K 2. Thus, only when the capacity of counter K 2 has not been exceeded, can pulses enter counter K 2. This prevents erroneous overflow of the counter.

In any event, when the count in counter K 1 reaches 8,192, latch L 1 is reset, and AND-gate G 1 is blocked, and AND-gate G 2 is opened. Now the pulses from source RFS are counted by counter K 2.

At the end of the cycle, which is also the beginning of the next cycle, the zero crossing detector ZD emits a pulse. This sets latch L 1 to the set condition, thus terminating the pulse train to counter K 2. The condition of its various outputs Q 1 through Q $n$; or Q 9 in the specific example, now exhibit in binary code, the number of pulses in excess of 8,192 that occurred in the cycle just completed. These outputs are connected to corresponding inputs I 1 to I N of the memory M.

The memory M can comprise nine bistable elements, with strobing means for setting the elements to the input states, and output connections for each element. The pulse from the detector ZD energizes the strobe input S of memory M, thus setting the nine elements to the digital number contained by counter K 2.

Figure 2:
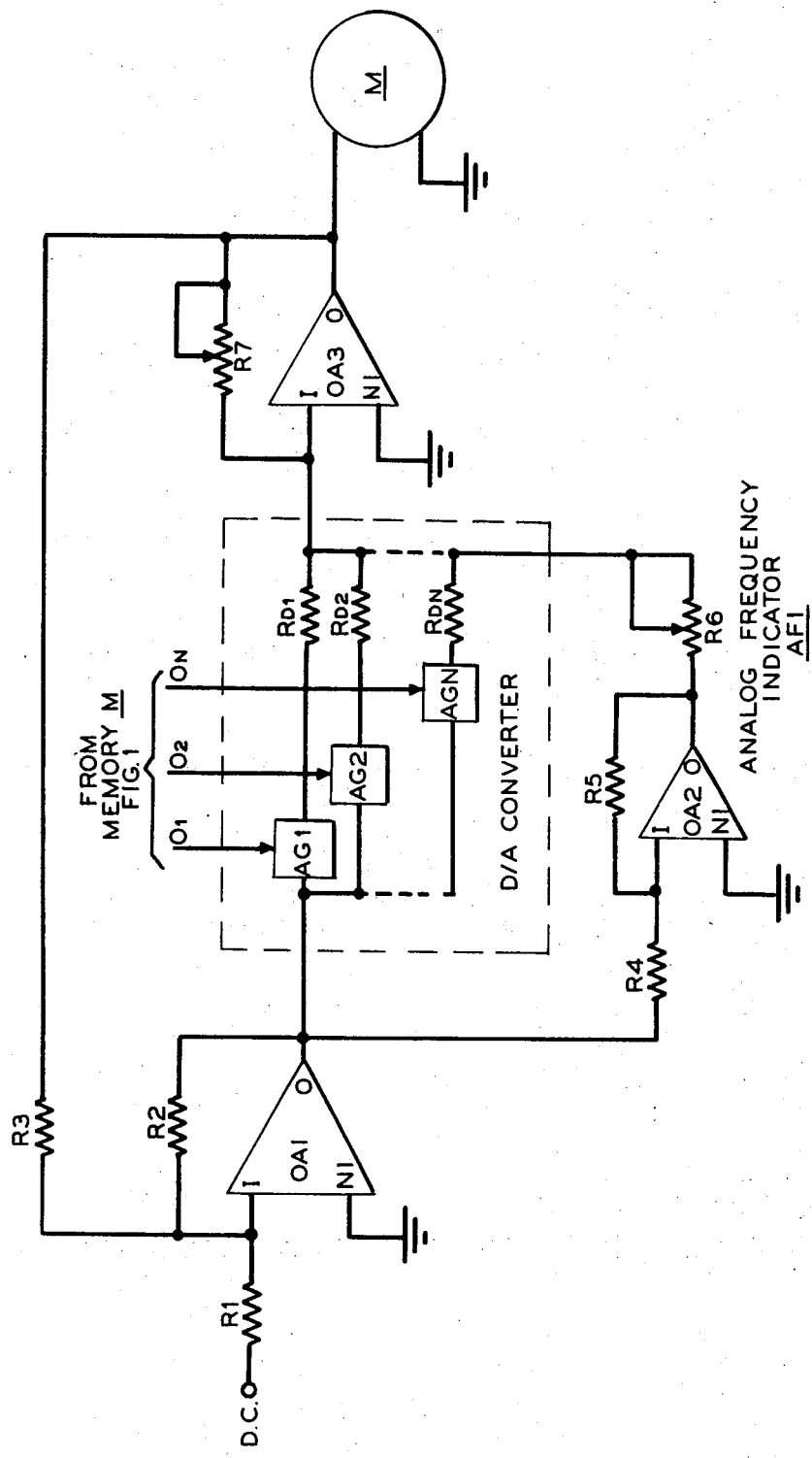
FIG. 2 is a block diagram of the digital-to-analog conversion, including the feedback means for linearizing the reciprocal of the actual measurement made.

This quantity information is available at outputs O 1 to O N, or O 9, and remains unchanged until the end of the next cycle. The outputs O 1 to O 9 are connected to analog frequency indicator AFI. FIG. 2 shows indicator AFI, which performs the conversion of this digital information to an analog voltage and displays the same on a D C meter. The indicator AFI comprises a D C meter M driven by a digital-to-analog converter with control and linearization circuits. In particular, such converter comprises an analog gate AG 1 to AG N for each binary digit, with suitably graded resistors, so that a fixed input voltage is converted to a current whose magnitude is a linear function of the digital number.

This is accomplished by making the resistors Rd 1, Rd 2 - - Rd $n$ double in value as their significance decreases. Thus, resistor Rd 1, the least significant bit resistor, is twice the value of resistor Rd 2.

Since the highest frequency of interest is the shortest time per cycle, counter K 2 will receive no pulses and stay in the reset condition. However, conventionally, the meter M should read full scale for this condition. It is therefore preferable to connect the memory M to the digital-to-analog converter so that in this case, the switches AG 1 to AG N are all in the closed condition. Consequently, the output current is at maximum. As the frequency decreases, the counter K 2 exhibits a higher count, selectively turning off the digital switches AG 1 to AG N, thus causing the output current to decrease.

Operational amplifier OA 1 having a feedback resistor R 2, receives a D C voltage from a stable source via a resistor R 1 at its inverting input I. By proper selection of resistors R 1 and R 2, this voltage is converted into a voltage suitable for the operation of the digital-to-analog converter. The purpose of this conversion is to give a "summing point" at input I, where the linearization voltage may be injected, as will hereinafter be described.

Operational amplifier OA 2 is used for zero output adjustment. It is desirable that 390 Hertz read as zero volts on meter M. However, a 390-cycle period equals 2.5641 microseconds, equal to 8,632 counts at the chosen clock frequency. This would put 8,632 - 8,192, or 440 counts into counter K 2. Since zero for the digital-to-analog converter is $2^9$ or 512 bits, the output would be 512 - 440 or 72 bits above zero.

Operational amplifier OA 2 inverts the input voltage, changing its absolute value if desired for design reasons of selection of resistors R 4 and R 5, and applies it to resistor R 6. By adjusting resistor R 6, a negative current equal to the digital-to-analog converter positive output at 72 bits may be added to the output, forcing the current for 390 Hertz as seen by amplifier OA 3 to be zero, thus giving a zero output to the meter M.

Operational amplifier OA 3 converts the current supplied by the digital-to-analog converter to a voltage suitable for operating the meter M. The actual voltage may be set by adjusting the value of resistor R 7.

Resistors R 6 and R 7 form adjusting points, whereby minor variations in clock frequency, stable D.C. source, etc., may be compensated. By feeding a stable 390 Hertz input, the zero point of meter M may be set by adjusting resistor R 6, and by feeding a stable 410

Hertz input, the full scale reading may be set by adjusting resistor R 7.

The frequency meter described so far is not linear with respect to frequency because a period has been measured and the frequency is inversely related to the period. In order to obtain an output which is linear with respect to frequency, a circuit is provided to inject a portion of the output signal into the input signal. In other words, a positive feedback having a particular value is required.

Thus, the output of operational amplifier OA 3 is connected via feedback resistor R 3 to the input I of operational amplifier OA 1. Since the output of operational amplifier OA 3 is in phase with the input of operational amplifier OA 1, the feedback is positive as required. It can be shown that the positive feedback factor must be equal to $\beta = \Delta/k2$, where $\Delta$ is the frequency range to be covered, $f_{max} - f_{min}$, and $k2$ is a proportionality factor in ohms per unit time multiplied by the ratio of $f_{max}$ to $f_{min}$.

I claim:

1. Apparatus for measuring the frequency of a periodically recurring signal comprising means for indicating the start of each cycle of the periodically recurring signal, a source of pulses having a frequency much higher than the frequency of the periodically recurring signal, first and second pulse counters, switching means for controllably connecting said source of pulses alternately to said first and second pulse counter, said switching means including first means responsive to said start of cycle indicating means to control said switching means to connect said source of pulses to the input of said first counter at the start of each cycle, and second means responsive to said first counter to connect said source of pulses to the input of said second counter whenever the pulse count in said first counter reaches a predetermined value, a count memory means connected to the output of said second counter for controllably storing the pulse count in said second counter, means connected to said indicating means for controlling said count memory means to store the count in said second counter at the start of each cycle of the periodically recurring signal, and means connected to said count memory means for converting the stored pulse count of said second counter to a linear analog representation of the frequency of the periodically recurring signal.

2. Apparatus as in claim 1 wherein said switching means comprises: a latch having a set input, a reset input, a set output, and a reset output; a first two-input AND-gate; and a second two-input AND-gate, means for connecting the output of said indicating means to the set input of said latch, means for connecting a particular output of said first counter to the reset input of said latch, means for connecting the set output of said latch to one input of said first two-input AND-gate, means for connecting the reset output of said latch to one input of said second two-input AND-gate, means for connecting the output of said source of pulses to the second input of each of said two-input AND-gates, means for connecting the output of said first two-input AND-gate to the input of said first counter and means for connecting the output of said second two-input AND-gate to the input of said second counter.

3. Apparatus as in claim 2 wherein each of said counters has a clearing input and further comprising means connected to the clearing input of said first counter for clearing said first counter whenever the count therein reaches said predetermined value and means connected to the clearing input of said second counter for clearing said second counter whenever the count in said first counter reaches a particular value which is less than said predetermined value.

4. Apparatus as in claim 2 wherein said means for connecting the output of said second two-input AND-gate to said second counter comprises a third two-input AND-gate and a multi-input NAND-gate, means for connecting the output of said second two-input AND-gate to one input of said third two-input AND-gate, means for connecting the output of said third two-input AND-gate to the input of said second counter, means for connecting the output of said multi-input NAND-gate to the second input of said third two-input AND-gate, and means for connecting each of the inputs of said multi-input NAND-gate to a different one of the outputs of said second counter.

5. The apparatus of claim 4 wherein each of said counters has a clearing input and further comprises means connected to said clearing input of said first counter for clearing said first counter whenever the count therein reaches said predetermined value and means connected to the clearing input of said second counter for clearing said second counter whenever the count in said first counter reaches a particular value which is less than said predetermined value.

6. The apparatus of claim 1 wherein said means for converting the stored count to an analog representation comprises an input amplifier for generating an input current, a digital-to-analog converting means for scaling said input current to values inversely related to the digital representation of the stored pulse count, an output amplifier having an input for receiving the scaled current and an output transmitting a signal proportional to the received scaled current and means connected to the output of said output amplifier for converting the signal therefrom to a linear visual representation of the frequency of a period recurring signal.

7. The apparatus of claim 6 wherein said input amplifier is an operational amplifier having an input and further comprising feedback means for connecting the output of said output amplifier to the input of said input amplifier.

8. The apparatus of claim 7, further comprising an inverting current amplifier connecting the output of said input amplifier to the input of said output amplifier in parallel with said digital-to-analog converting means for zero adjusting the scaled current received at the input of said output amplifier.

9. The apparatus of claim 4 wherein said means for converting the stored count to an analog representation comprises an input amplifier for generating an input current, a digital-to-analog converting means for scaling said input current to values related to the digital representation of the stored pulse count, an output amplifier having an input for receiving the scaled current and an output transmitting a signal proportional to the received scaled current and means connected to the output of said output amplifier for converting the signal therefrom to a visual representation.

10. The apparatus of claim 9 wherein said input amplifier is an operational amplifier having an input and further comprising feedback means for connecting the output of said output amplifier to the input of said input amplifier, and an inverting current amplifier connecting the output of said input amplifier to the input of said output amplifier in parallel with said digital-to-analog converting means for zero adjusting the scaled current received at the input of said output amplifier.

* * * * *